INVENTORS
B. E. EWERS
LEE TUCK
BY
ATTORNEYS

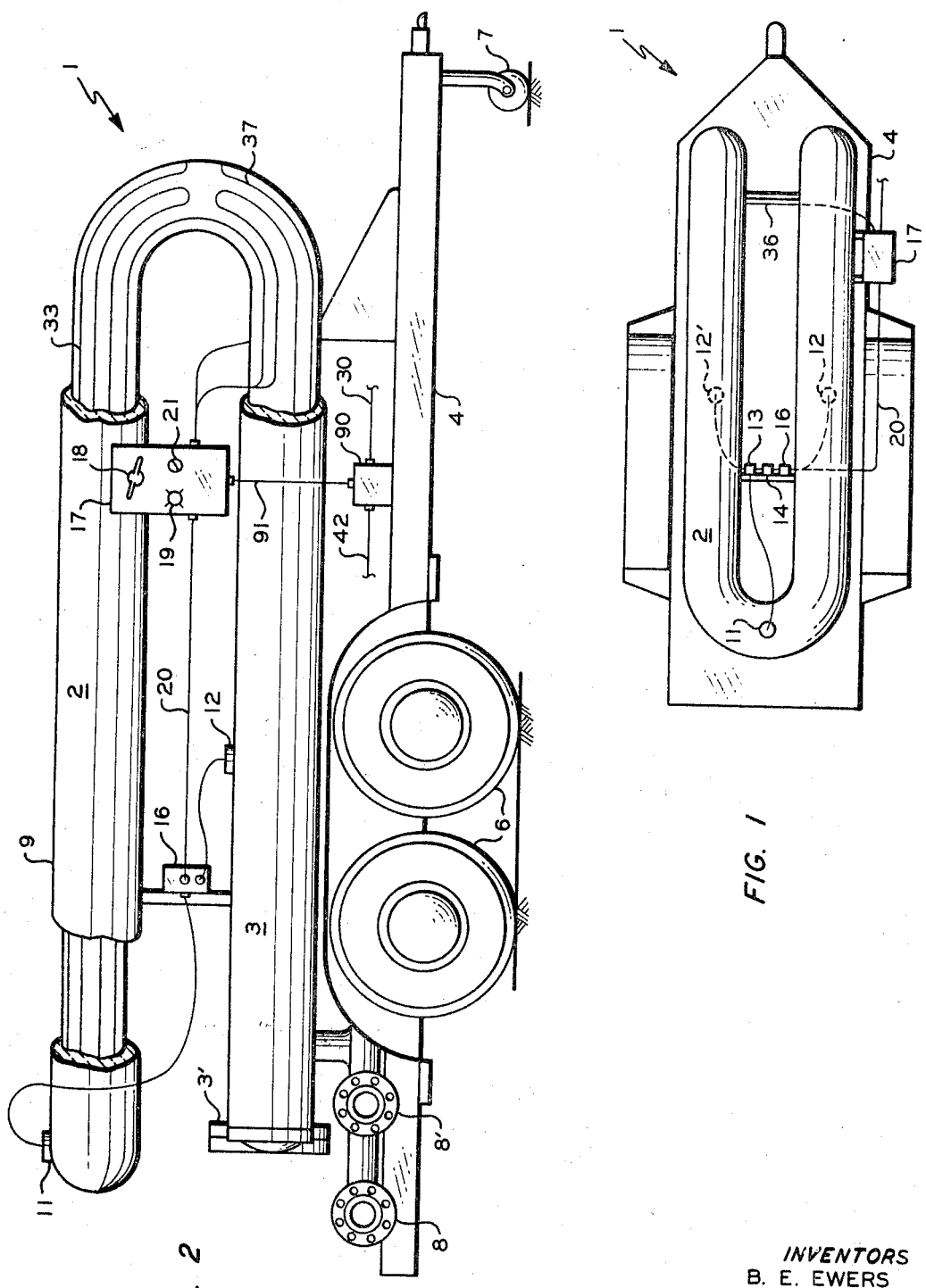

United States Patent Office 3,446,055
Patented May 27, 1969

3,446,055
METER CALIBRATION
Lee Tuck and Bruce E. Ewers, Bartlesville, Okla., assignors to Phillips Petroleum Company, a corporation of Delaware
Filed Sept. 26, 1966, Ser. No. 582,041
Int. Cl. G01f 25/00
U.S. Cl. 73—3      2 Claims

ABSTRACT OF THE DISCLOSURE

A flow meter is calibrated by diverting the process stream flow near the meter into a tubular free piston type calibration apparatus after which the metered liquid is removed from the apparatus by suitable pumping means and the meter prover is heated by a controlled amount to vaporize a part of the metered liquid thereby expediting the removal of liquid from the apparatus without subjecting either the process media or calibration apparatus to atmospheric contamination.

---

Figure 3:
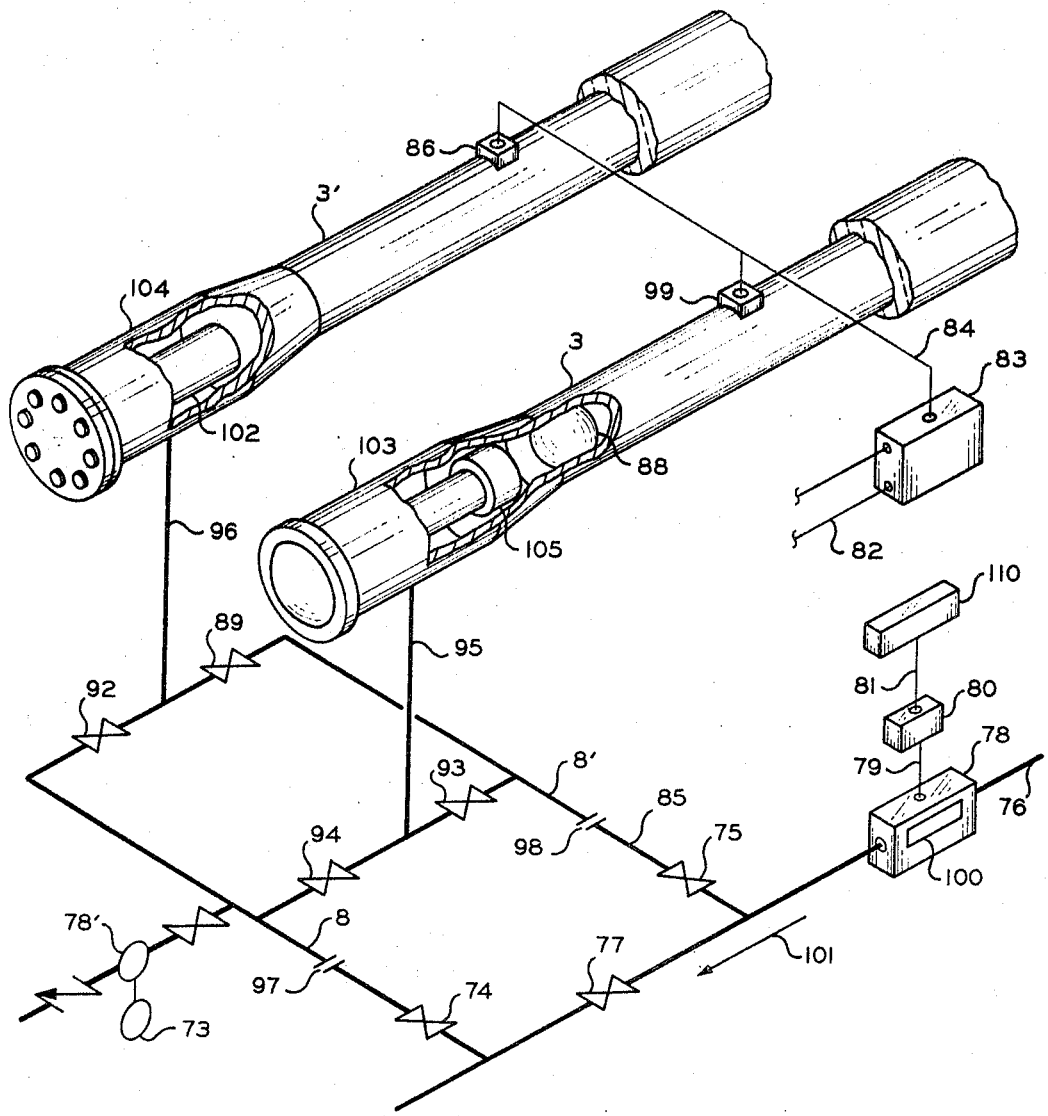

This invention relates to the calibration of fluid meters. In one aspect, metered liquid is removed from a meter prover or calibration apparatus following a calibration cycle by pumping the liquid from the apparatus and simultaneously heating the calibration apparatus to volatilize residual liquid, thereby maintaining pump suction pressure. In another aspect, the degree of removal of residual liquid from meter calibration apparatus is increased by heating the apparatus to vaporize residual liquid during the return cycle. In another aspect of this invention, a flow meter is calibrated by diverting the process stream near the flow meter through a free piston type calibration apparatus after which the metered fluid is forced from the apparatus by heating the metering apparatus and volatilizing a part of the metered liquid.

Portable meter provers are used to calibrate various types of liquid flow meters and a single meter prover or calibration apparatus is often employed on process streams of varying composition. Following calibration of a meter, the prover contains metered liquid that must be removed before employing the apparatus to calibrate another flow meter operating on a process stream of different composition in order to avoid contamination. The customary method for removing metered liquid from such apparatus is to vent the apparatus to atmosphere and pump the contained liquid back into the process stream. However, this procedure suffers from the defect that it necessitates the admission of air to the interior of the calibration apparatus and promotes atmospheric contamination of the metered liquid.

It is therefore one object of this invention to provide a method for removing metered liquid from meter calibration apparatus which avoids atmospheric contamination of the apparatus or process stream metered. It is another object of this invention to provide a method for increasing the degree of removal of metered liquid from meter calibration apparatus while avoiding atmospheric contamination. It is yet another object of this invention to provide a meter proving or calibration apparatus which does not necessitate exposure of the process stream or the interior of the calibration apparatus to atmospheric contamination. It is yet another object of this invention to provide a meter proving or calibration apparatus having means for heating the apparatus by a controlled amount subsequent to calibration to expedite the removal of metered liquid from the apparatus.

Other aspects, objects and the several advantages of the invention will be apparent to one skilled in the art from a study of this disclosure, the drawings and the appended claims.

In accordance with one embodiment of this invention, a flow meter is calibrated by diverting the process stream flow near the meter into a tubular free piston type calibration apparatus after which the metered liquid is removed from the apparatus by suitable pumping means and the meter prover is heated by a controlled amount to vaporize a part of the metered liquid thereby expediting the removal of liquid from the apparatus without subjecting either the process media or calibration apparatus to atmospheric contamination.

The calibration apparatus employed in the concept of this invention can be essentially any type of meter prover which operates by diverting the process stream flow into the calibration apparatus with the requisite that the diverted material be returned to the process stream. The presently preferred calibration apparatus is the mechanical displacement type of variety manufactured by F. H. Maloney Company, a division of Helmerich & Payne, Inc., Houston, Texas. The invention will be described with particular reference to the Maloney model T-61 portable meter provers, although it is obvious that the concept of this invention is equally applicable to numerous other varieties of calibration apparatus.

Figure 4:
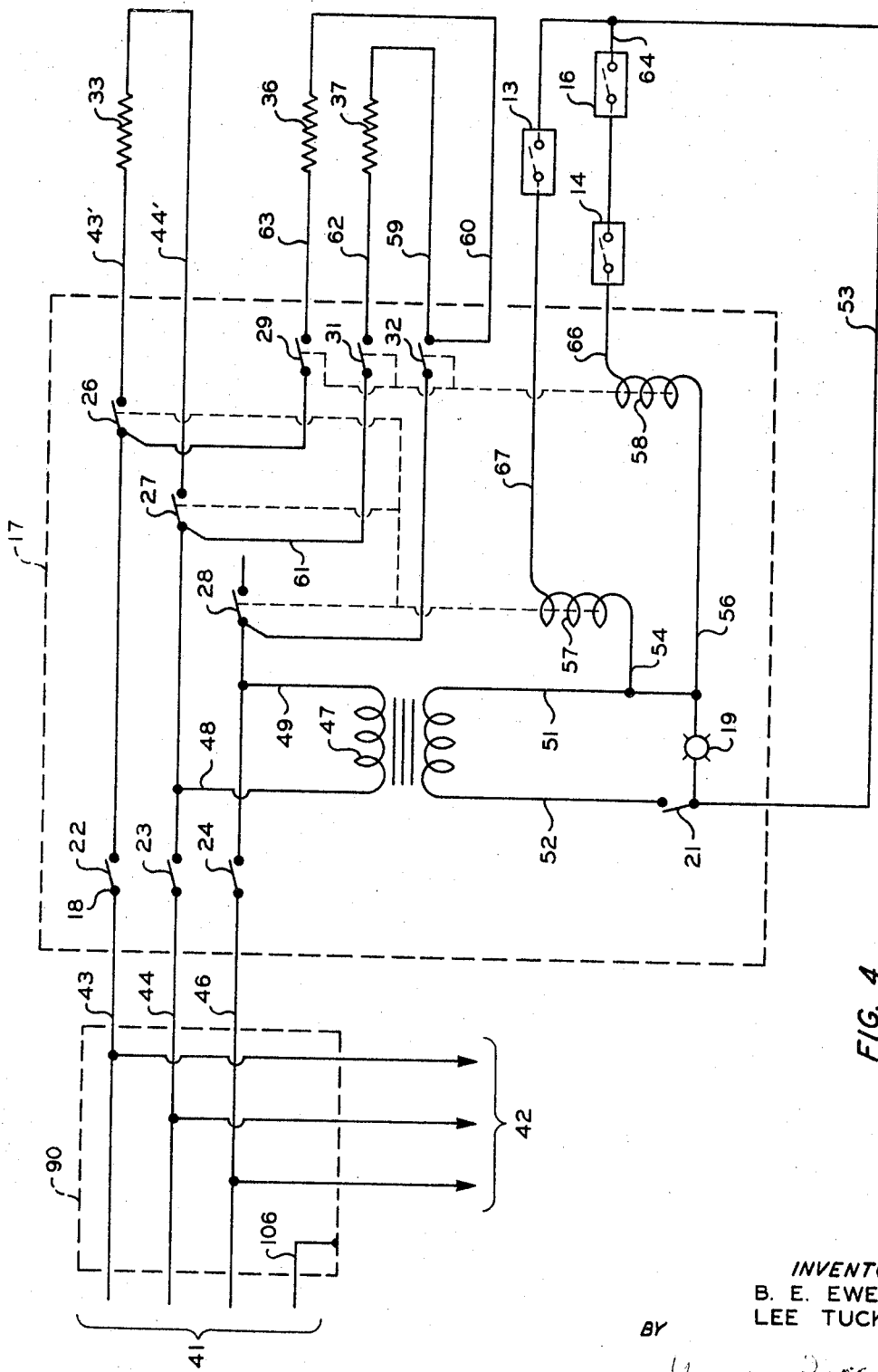

The invention can be better understood by reference to the drawings, of which FIGURE 1 is a top view of the portable meter prover of the preferred variety, FIGURE 2 is a side view of the same apparatus, FIGURE 3 is an isometric view showing a portion of FIGURE 2, and FIGURE 4 is a schematic illustration of the circuitry employed in the operation of the meter prover heater.

Referring now to the drawings, FIGURE 1 shows a top view of a meter prover which can be employed in effecting the concept of this invention, showing the upper part of the calibrated double hairpin tube 2 mounted on trailer 4 with complementary temperature sensing and controlling apparatus such as thermostat bulbs 12, 12' and 11 in communication with thermostats 13, 14 and 16. Hereinafter detailed breaker and contact circuits can be contained in suitable housing means 17. Thermostat bulb 11 is preferably located on the upper tube portion at a point located halfway between the two effective extremities of the calibration tube. Thermostat bulbs 12 and 12' are located on the lower portions of the calibrated double hairpin tube as illustrated better in FIGURE 2.

The entire installation illustrated in FIGURE 2 can be provided with suitable heat insulation 9. The upper portion of the double hairpin tube is further provided with upper zone heating cables 33 while the two lower sections are provided with separate heating cables 37 and 36, the latter of which serves the second lower section not seen in FIGURE 2. The electric potential developed by thermostat bulbs 11, 12 and 12' are passed by capillary tubes to on-off thermostats 16, 14 and 13, which in turn communicate with breaker and contactor housing 17 by way of cable 20. These breaker and contactor circuits hereinafter detailed serve to govern the operation of heaters 33, 36 and 37 in a predetermined manner in relation to the operation of thermostats 13, 14 and 16.

The power requirements of the heater and control circuits are supplied by suitable electric cable 30, this power being distributed between the breaker and the contactor circuits housed in housing 17 and the existing load on the apparatus by means of cables 91 and 42, respectively.

The process stream is admitted to and removed from the calibration apparatus through conduits 8 and 8' and suitable manifolding as better illustrated in FIGURE 3.

FIGURE 3 illustrates the two lower portions of the double hairpin tube as seen in FIGURE 2. The two lower sections 3 and 3' are provided at their extremities with blind flanges 97 and 98 and communicate with conduits 8 and 8' by way of pipes 95 and 96 entering the apparatus from the other side as illustrated in FIGURE 3. The calibration apparatus of this embodiment is of the free piston type; i.e., a free piston conforming to the interior dimensions of the calibration apparatus is caused to move between two predetermined points within the apparatus under the influence of flow from the process stream and the time at which the piston passes these predetermined points is determined by suitable detecting means such as 86 and 99 in FIGURE 3. Signals from these switches are transmitted through cable 84 to counter 83 which records the time interval during the passage of the piston 88 between detectors 86 and 99.

The apparatus is further provided with valves 92, 94, 93 and 89 for directing the admission and removal of process media during the calibration cycle. The apparatus is attached to process stream 76 by suitable flange means 97 and 98 and communication with the meter prover is further controlled by the operation of valves 74 and 75 with valve 77 being closed.

The flow meter to be calibrated is provided with suitable gearing means 100 and mechanical transfer means 79 for operating tachometer 80 which in turn converts the mechanical signals to electrical impulses indicative of the number of revolutions of the meter 78. This signal is in turn related by way of instrument cable 81 to counter 110. Mechanical counters can be used on the meter.

In the operation of the apparatus the flow in process line 76 passing in the direction of arrow 101 is conveyed through the meter to be calibrated 78 and the number of meter revolutions is indicated on counter 110 by the above described sequence of operations. Valves 75, 93, 92 and 74 are opened, while valves 77, 89 and 94 are closed, thereby allowing the passage of the process medium into the calibration apparatus by way of pipes 85 and 8'. The liquid enters the apparatus by way of valves 93 and pipe 95 thereby forcing piston 88 to travel ahead of the process fluid through lower section 3 and upwardly into upper section 2 illustrated in FIGURES 1 and 2 and then downwardly into the second lower section 3' where its travel is stopped by suitable stop means 102 located within the double hairpin tube. Due to the expansion of the tube at its terminal extremity 104 the fluid is allowed to bypass piston 88 in its arrested position and pass from the meter prover by way of pipe 96, valve 92, pipe 8, and valve 74.

During this operation the piston first passes detector 99 at which time a signal is forwarded to counter 83 by way of electrical cable 84. After the piston has passed through the upper section of the calibration tube and downward into lower section 3' as above described, it contacts the second detector 86 which relays a second signal by way of cable 84 to counter 83. Therefore, the number of revolutions of meter 78 during the period required for the passage of piston 88 between the two contactors 99 and 86 is readily ascertainable by comparison of the time lapse between the detectors as recorded by 83 and the number of revolutions of tachometer 80 as recorded by 110. Likewise, since the volume of the double hairpin tube between the locations of the two detectors 99 and 86 is known, the volume of material which passes through meter 78 during this same period is also known. This volume is then compared to the volume recorded by the meter indicator and the necessary corrections can be made.

The operation of the meter prover can then be repeated by closing valves 92 and 93 and opening valves 94 and 89, thereby allowing admission of the process stream to the lower side of the double hairpin tube 3' by way of pipe 8', valve 89 and pipe 96. As a result, piston 88, now at rest on stop 102 in expanded section 104, is caused to progress through lower section 3' through upper section 2 and downwardly into lower section 3 where it finally comes to rest against stop 105. In this position, piston 88 has entered expanded section 103 thereby allowing exit of the process stream past the piston by way of pipe 95, valve 94 and pipe 8. During this operation, detectors 86 and 89 are contacted in reverse order as above described, thereby providing a check on the previous calibration.

Following the completion of the calibration cycle, it is necessary to remove the process fluid from the calibration apparatus sufficiently to prevent contamination of product streams on which the calibration apparatus will be subsequently employed. In many instances, it is also highly desirable to prevent the contamination of the product which results on exposure to the atmosphere. As a result, it is desirable to avoid creating a vacuum on the suction side of pump 78' which serves the purpose of forcing the process fluid to return to process line 76.

During this operation, valves 74, 75, 93 and 89 are closed and valves 92 and 94 are open. This discharge from pump 78' is pumped back into line 76 through a valve and connection (not shown). In particular, valve 77 should be open prior to closing inlet valves 75, 93, 89 or 74.

In the presently preferred mode of operation, pump 78' is allowed to operate with the above-described valve settings for a period sufficient to remove most of the process fluid from the other section of double hairpin tube 2 after which time the heater circuitry illustrated in FIGURE 4 and briefly described in connection with FIGURES 2 and 3 can be activated either manually or automatically by suitable timing means to heat the apparatus and utilize at least part of the fluid remaining therein. This operation not only expedites removal of material from the process by maintaining pump suction pressure but also increases the degree of removal achieved. All of heaters can be turned on when the pump is started.

In the presently preferred mode of operation, after the prover has been used, heat is supplied first to the upper section of the tube 2 because the upper section is the first part that is emptied when the pump 78 is placed in operation for emptying the double hairpin tube. The heater to the upper section will be the first to automatically cut off after the fluid therein has been emptied. Fluid in the tubes may be pumped back into the pipeline or to separate tank as desired. Heat is applied to the lower two sides 3 and 3' of the prover as the fluid leaves those tubes. It can thus be seen that, as the fluid leaves the tube, the vapor pressures produced by heating the remaining fluid tends to drive out nearly all of the process fluid, for example, hydrocarbons, leaving very little material in place which might cause corrosion, etc., since no oxygen has been admitted to the tubes. The prover is thus ready for reuse without the necessity of having to clean the prover before reuse.

Junction box 90 as shown in FIGURE 4, is supplied with 480 volt three-phase current by leads 41. Leads 43, 44 and 46 are connected into breaker and contactor box 17. Breaker contact switches 22, 23 and 24 are operated manually by handle 18 or alternatively can be operated by solenoids if desired. Current is supplied to heat the upper tube section 2 from lead 43, through switch 26, cold section 43', heater 33, cold section 44', switch 27 to lead 44. Current is supplied to heat the right lower tube 3 from lead 44, lead 61, switch 31, cold section 62, heater 37, cold lead 59, switch 32, and lead 46. The necessary power for heating the left lower tube 3' is supplied by way of lead 43, switch 29, cold section 63, heater 36, cold section 60, switch 32, and lead 46. It thus can be seen that each heater is connected to two power leads in the three phase circuit.

A step-down transformer shown at 47 is connected across leads 44 and 46 by leads 48 and 49, respectively. The secondary of transformer 47 is connected to leads 52 and 51 with lead 51 being connected to the thermostat switches through relays 57 and 58. Lead 52 is connected through manually operated switch 21 to lead 53 which is connected to the opposite sides of the thermostat switches.

A pilot light 19 is connected between leads 56 and 53 to indicate that the thermostats are in operation. The thermostats are set to open when the temperature reaches a predetermined level. It should be noted that thermostats 14 and 16 are connected in series and operated such that, should the temperature of either heater 36 or 37 exceed a predetermined level, relay 58 will open switches 29, 31 and 32. Thermostat 13 operates to cause relay 57 to open switches 26, 27 and 28. Switch 28, as shown, is not connected to any operating device but is dead-ended.

Current to relay 57 is supplied from the secondary coil of transformer 47 over leads 51, 54, relay coil 57, lead 67, thermostat 13, lead 53, through switch 21 to lead 52 which connects to the opposite end of the secondary coil of transformer 47.

Current to relay 58 is supplied from the secondary coil of transformer 47 over lead 51, 56, relay coil 58, lead 66, thermostats 14, 16, lead 64, lead 53, switch 21, lead 52, which connects to the opposite end of the secondary coil of transformer 47. The cold sections consist of leads going to the heaters and operate such that only that portion of the heater which is supposed to heat heats the prover tube and, thus, no waste of heat or current occurs.

The thermostat bulbs and thermostats (switches) are available from numerous manufacturers such as, for example, Thermon Manufacturing Company, Houston, Texas. The heater cables 33, 36 and 37 are also available from numerous sources. Suitable cables are, for example, the 2B series heater cables, preferably 2B20, manufactured by Thermon Equipment Corporation, Electric Heating Division, Houston, Texas.

In the presently preferred embodiment of this invention, the heaters are controlled by thermostats within the range of from about 180 to about 200° F. when operating in process streams comprised of hydrocarbons ranging from propane to lighter components found in topped crude or vacuum reduced crude. Of course, a much wider range of operating conditions is possible in that it is only necessary that the temperature be high enough to effect the vaporization of the process fluid remaining in the calibration apparatus. However, it is presently preferred the the temperature inside of the apparatus be within the range of about 180° F. to prevent damage to the liner inside the prover.

Numerous variations, modifications and embodiments of this invention will be apparent to one skilled in the art in view of the foregoing disclosure, and drawings, the essence of which is that there is provided a method and apparatus for heating process material contained within a meter prover to vaporize a part of said material thereby forcing its removal from the calibration apparatus.

We claim:

1. Apparatus for calibrating liquid flow meters which comprises closed tubular conduit means of substantially constant interior cross-sectional configuration and dimension throughout its operating length, said conduit having therein a free moving piston, the surface of said piston conforming to said interior cross-section thereby preventing the passage of said liquid by said piston, piston stopping means at either end of said conduit for retaining said piston within said operating length, first lead conduit means communicating with said process stream at a first point and with one end of said tubular conduit, second lead conduit means communicating with said process stream at a second point downstream of said first point and further communicating with the other end of said tubular conduit means, each of said lead conduit means having valve means therein for controlling the flow of material therethrough, one of said lead conduit means having therein liquid pumping means for returning liquid from said tubular conduit to said process stream, valve means in said process stream between said first and said second points for diverting said flow through said tubular conduit, liquid volume metering means in direct communication with said process stream upstream of said lead conduit means for measuring the flow of liquid therethrough and providing an indication of the volume of said flow, means for detecting the passage of said free moving piston past spaced points in said conduit means, whereby the volume of the conduit between these spaced points can be compared with the reading of said metering means at corresponding times, means for removing the liquid from said tubular means comprising a thermostatically controlled heating means in heat exchange relationship with said tubular conduit for heating said tubular conduit to a predetermined temperature, temperature sensing means in heat exchange relationship with said tubular conduit for developing a signal indicative of the temperature of said tubular conduit, and means for receiving said signal and controlling the operation of said heating means in response thereto.

2. The apparatus of claim 1 wherein said tubular conduit further comprises upper and lower communicating sections, said upper and lower sections having separate heating and temperature sensing means, and control means for governing the operation of said heating means in response to the temperature of said sections individually and maintaining the temperature of said sections at predetermined values.

References Cited

UNITED STATES PATENTS

| | | | |
|---|---|---|---|
| 2,991,645 | 7/1961 | Lauderdale | 73—3 |
| 3,120,118 | 2/1964 | Boyle | 73—3 |
| 3,273,375 | 9/1966 | Howe | 73—3 |

LOUIS R. PRINCE, *Primary Examiner.*

HARRY C. POST III, *Assistant Examiner.*

U.S. Cl. X.R.

15—104.06; 137—268